(12) United States Patent
Odinak et al.

(10) Patent No.: US 9,159,054 B2
(45) Date of Patent: Oct. 13, 2015

(54) SYSTEM AND METHOD FOR PROVIDING GUIDANCE TO PERSUADE A CALLER

(71) Applicant: Intellisist, Inc., Seattle, WA (US)

(72) Inventors: Gilad Odinak, Bellevue, WA (US); Thomas Veatch, Seattle, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

(21) Appl. No.: 14/485,589

(22) Filed: Sep. 12, 2014

(65) Prior Publication Data

US 2015/0003605 A1 Jan. 1, 2015

Related U.S. Application Data

(63) Continuation of application No. 13/549,249, filed on Jul. 13, 2012, now Pat. No. 8,837,706.

(60) Provisional application No. 61/508,002, filed on Jul. 14, 2011.

(51) Int. Cl.
*H04M 3/00* (2006.01)
*G06Q 10/10* (2012.01)
*H04M 3/51* (2006.01)
*G10L 15/08* (2006.01)
*G10L 25/60* (2013.01)
*H04M 3/523* (2006.01)
*G10L 17/26* (2013.01)

(52) U.S. Cl.
CPC ............ *G06Q 10/1053* (2013.01); *G10L 15/08* (2013.01); *G10L 25/60* (2013.01); *H04M 3/51* (2013.01); *H04M 3/5175* (2013.01); *H04M 3/5232* (2013.01); *G10L 17/26* (2013.01); *H04M 3/5233* (2013.01); *H04M 2203/402* (2013.01)

(58) Field of Classification Search
CPC ............ H04M 3/5175; H04M 3/5183; H04M 3/5233; H04M 3/5232; H04M 3/493; H04M 3/4936
USPC .................. 379/265.01, 88.01–88.02, 265.12
See application file for complete search history.

(56) References Cited

U.S. PATENT DOCUMENTS

| | | | |
|---|---|---|---|
| 7,254,383 B2 | 8/2007 | Novack et al. | |
| 2002/0046030 A1 | 4/2002 | Haritsa et al. | |
| 2004/0096050 A1 | 5/2004 | Das et al. | |
| 2005/0286705 A1 | 12/2005 | Contolini et al. | |
| 2006/0067508 A1 | 3/2006 | Basson et al. | |
| 2009/0187414 A1 | 7/2009 | Haskins et al. | |
| 2009/0214004 A1 | 8/2009 | Caraballo et al. | |
| 2010/0138037 A1* | 6/2010 | Adelberg et al. | 700/241 |
| 2013/0243181 A1* | 9/2013 | Sirstins et al. | 379/266.07 |

* cited by examiner

*Primary Examiner* — Rasha Al Aubaidi
(74) *Attorney, Agent, or Firm* — Patrick J. S. Inouye; Krista A. Wittman

(57) ABSTRACT

A system and method for providing guidance to persuade a caller is provided. A call is received from a caller into a call center and an offer is provided to the caller. A likelihood of the caller to accept the offer is measured by analyzing voice input of the caller during the call. One or more paralinguistic voice characteristics in the voice input are determined. A stage of persuasion is assigned to the caller based on the paralinguistic voice characteristics and a recommendation is made for guidance to persuade the caller to accept the offer.

20 Claims, 10 Drawing Sheets

90

SYSTEM AND METHOD FOR PROVIDING GUIDANCE TO PERSUADE A CALLER

CROSS-REFERENCE TO RELATED APPLICATION

This application is a continuation of U.S. Pat. No. 8,837,706 issued Sep. 16, 2014, which claims priority under 35 U.S.C. §119(e) to U.S. provisional patent application Ser. No. 61/508,002, filed Jul. 14, 2011, the disclosures of which are incorporated by reference.

FIELD

The present invention relates in general to voice analysis and, in particular, to a system and method for providing guidance to persuade a caller.

BACKGROUND

Customer call centers, or simply, "call centers," are often the first point of contact for customers seeking direct assistance from manufacturers and service vendors. Call centers are reachable by telephone, including data network-based telephone services, such as Voice-Over-Internet (VoIP), and provide customer support and problem resolution. Although World Wide Web- and email-based customer support are becoming increasingly available, call centers still offer a convenient and universally-accessible forum for remote customer assistance.

The timeliness and quality of service provided by call centers is critical to ensuring customer satisfaction. However, customers become less tolerant of delays, as the amount of delay increases. Minimizing delays is crucial, even when caller volume is high. Further, customers may experience frustration due to ineffective agents that fail to resolve callers' issues or concerns, agents that are unable to understand the position of the caller. Further, agents and callers that do not understand each other's speech or explicit or implicit communications can hinder the communication between the agent and caller, as well as frustrate both parties. Caller experience can be optimized by adjusting the responses of an agent or automated response system based on caller and agent traits.

Currently, call centers utilize information received directly from a caller or gathered from the caller without a prompt, such as from caller ID, in an attempt to shorten call times and timely satisfy caller requests and concerns. However, current call centers fail to collect, analyze, and use voice characteristics from a caller's speech to increase call center efficiency, agent success, and caller satisfaction.

Accordingly, a system and method to identify and utilize agent and caller traits is needed. Preferably, the system and method will use the traits to increase efficiency and effectiveness of a call center, such as during agent hiring, identity confirmation, matching agents with callers, and influencing agents so as to improve call quality metrics, such as to successfully close a transaction, as well as guide automated call handling systems to more appropriately and successfully respond to callers.

SUMMARY

Voice analysis is performed on a user to obtain measurements of speech and identify user traits. The user can be identified by collecting identifying information about the user, such as name, identification number, address information, or other useable information by asking the user or by taking the information from the user without a request, such as by caller ID or via voice characteristics. The user is observed through recording and measurements of his speech or other input, such as through a telephone keypad. The input can be provided in response to a prompt or unprompted. The user is then characterized by classifying measurements from the speech according to a quantitative model of speaker variation. The speech measurements can be taken from one or more snippets of speech verbally spoken into a telephone or computer as an initial step of a voice assessment for assessing the user's traits. Subsequently, the traits can be used to make a hiring decision regarding the user, confirm the user's identity, match the user with an agent or caller, and provide guidance to the user or automated voice response system in dealing with a caller.

An embodiment provides a system and method for providing guidance to persuade a caller. A call is received from a caller into a call center and an offer is provided to the caller. A likelihood of the caller to accept the offer is measured by analyzing voice input of the caller during the call. One or more paralinguistic voice characteristics in the voice input are determined. A stage of persuasion is assigned to the caller based on the paralinguistic voice characteristics and a recommendation is made for guidance to persuade the caller to accept the offer.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Voice characteristics of callers and agents can be analyzed to identify traits, which can be utilized to increase sales and efficiency within a call center. Specifically, the traits can be identified through linguistic and paralinguistic analysis of a voice sample. Once identified, the traits can be used to evaluate a potential agent's suitability as an agent, confirm an identity of a caller or agent, match agents with callers based on similar traits, and coach or otherwise influence an agent or an automatic dialog system to improve quality metrics. For example, the agent can manage a caller's responses and future behavior to successfully close a transaction.

Figure 1:
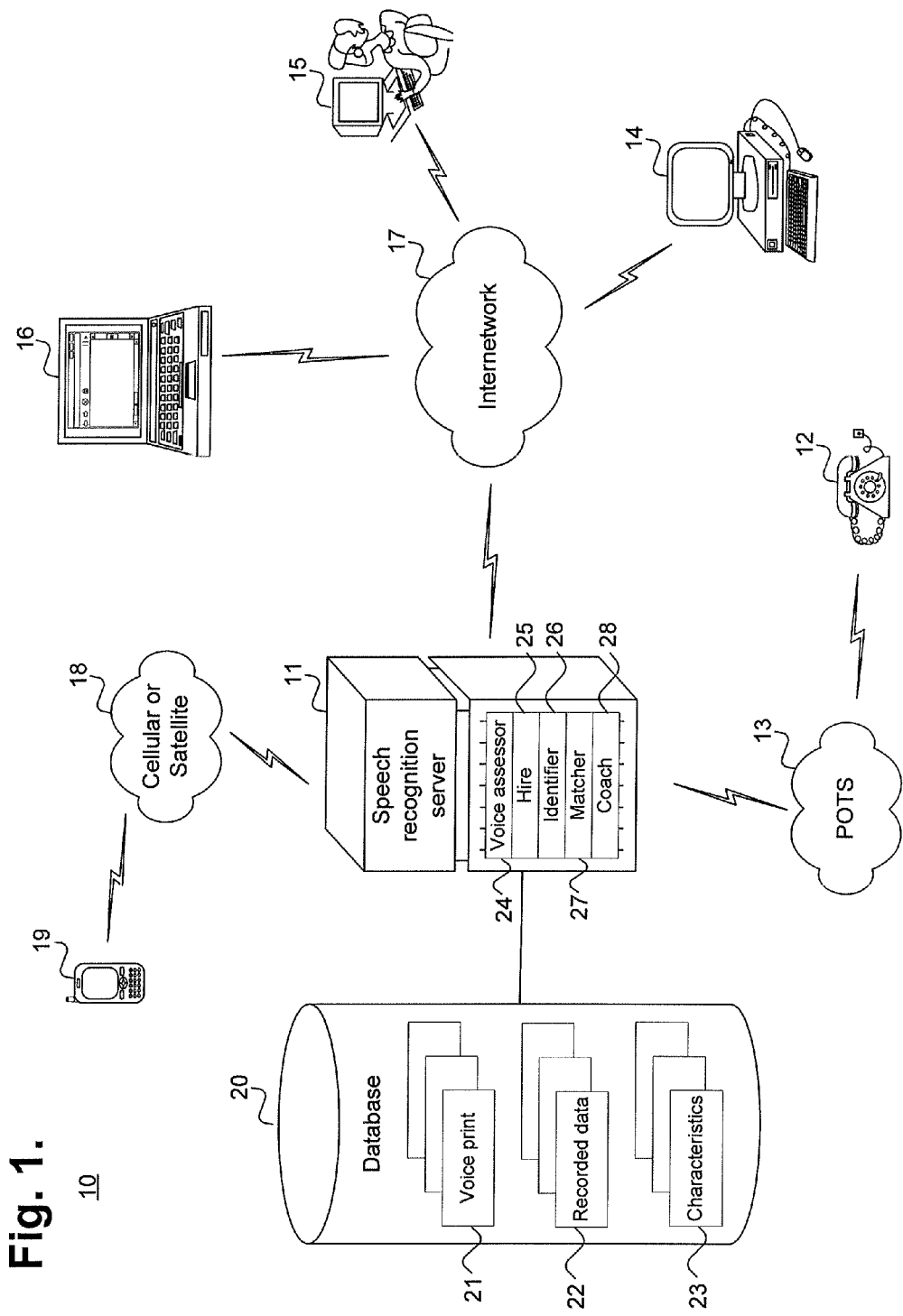
FIG. 1 is a block diagram showing a system for assessing and utilizing user traits in a call center environment, in accordance with one embodiment.

Identifying user traits requires a system involving analysis of voice samples. FIG. 1 is a functional block diagram showing a system 10 for assessing user traits in a call center environment, in accordance with one embodiment. A speech recognition server 11 is interconnected to conventional telephone handsets 12 through Plain Old Telephone Service (POTS) 13, portable handsets 19 through cellular and satellite telephone service 18, and desktop 14 or portable 16 computers, including VoIP clients, Internet clients and Internet telephony clients, through an internetwork 17, such as the Internet. The speech recognition server 11 receives a voice stream 22 from a user via the conventional telephone handsets 12, portable handsets 19, and computers 14, 16. The voice stream 22 can be provided as a real-time voice stream or as a recorded voice message and can be stored in a database 20 coupled to the speech recognition server 11. The speech recognition server 11 can include a voice assessor 24, hiring decision-maker 25, identifier 26, matcher 27, and coach 28.

The voice assessor 24 analyzes voice samples from users using voice characteristics, such as pitch and intonation to identify traits associated with the users. A user is intended to refer to both a caller and agent unless otherwise indicated. The voice assessor 24 can include submodules, such as an audio recording and playback submodule (not shown), a parameter extraction submodule (not shown), a speech recognizer and pattern matcher (not shown), a results analyzer (not shown) with a results analysis and model generation and comparison module (not shown), and a user trait extractor (not shown). Specifically, the audio recording and playback submodule obtains audio recordings from the database 20 for playback during analysis. The parameter extraction submodule analyzes the audio recording and identifies voice characteristics within the audio recording. The speech recognizer and pattern matcher converts the voice stream to text. The results analyzer produces numbers or scores representing how well a user's speech fits a model or population.

Finally, the user trait extractor compares the number or score to a threshold and determines whether the number or score assigned to the user's speech satisfies the threshold. If so, a trait associated with the model or population is identified and from the analyzed audio recording based on the identified voice characteristics. Assessment of the voice samples is further discussed below with reference to FIG. 2, while the voice characteristics are further discussed below with reference to FIG. 3.

The hiring decision-maker 25 utilizes results from the voice assessor to score the voice sample and to contribute to a hiring decision regarding the user. Agent hiring is further discussed below with reference to FIG. 6. The identifier 26 utilizes the results from the voice assessor 24 to confirm an identity of the user through voice analysis. Identity confirmation is further discussed below with reference to FIG. 8. The matcher 27 utilizes the user traits to match a user, such as a caller or agent, with an agent or caller, respectively. Matching agents and callers is further discussed below with reference to FIG. 9. The coach 28 utilizes the traits to classify the caller and to provide guidance to the agent based on the caller classification. Agent coaching is further discussed below with reference to FIG. 10.

The handsets 12, 19, computers 14, and speech recognition server 11 each include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to the handsets and computers, are possible.

Additionally, the handsets 12, 19, computers 14, 16, and speech recognition server 11 can each include one or more modules for carrying out the embodiments disclosed herein. The modules can be implemented as a computer program or procedure written as source code in a conventional programming language and is presented for execution by the central processing unit as object or byte code or written as interpreted source code in a conventional interpreted programming language interpreted by a language interpreter itself executed by the central processing unit as object, byte, or interpreted code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
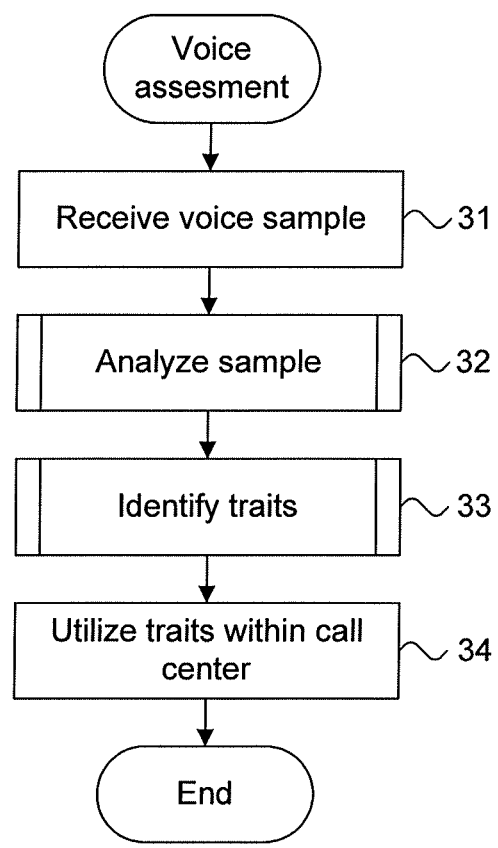
FIG. 2 is a flow diagram showing a method for assessing and utilizing user traits in a call center environment, in accordance with one embodiment.
Figure 3:
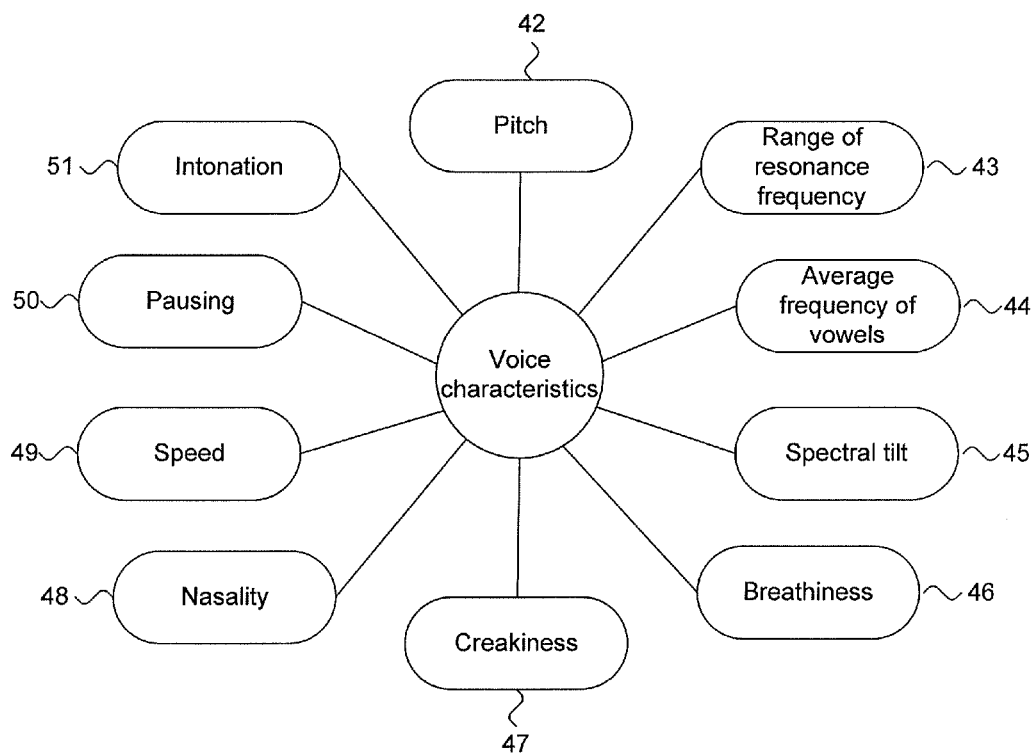
FIG. 3 is a flow diagram showing, by way of example, voice characteristics for voice analysis.

Voice assessment can be used to identify user traits via linguistic and paralinguistic factors. FIG. 2 is a flow diagram showing a method for assessing and utilizing voice assessment, in accordance with one embodiment. A voice sample is received (block 31) from a user, such as a caller or an agent. Specifically, the user repeats one or more predetermined text passages or pass phrases one or more times into a telephone. The voice sample is analyzed (block 32) to identify traits (block 33) of the user for utilizing in the call center (block 34). Specifically, voice characteristics, including linguistic and paralinguistic factors can be identified within the voice sample and used to identify traits associated with the user. The determined traits can be absolute or perceived, such as competence or intelligence level. FIG. 3 is a flow diagram showing characteristics of voice sample analysis. During analysis of a voice sample, the following characteristics are measured and calculated, including pitch 42, range of resonance frequencies of vowel 43, average resonance frequency of particular vowels 44, spectral tilt 45, breathiness 46, creakiness 47, nasality 48, speed of words 49, pauses 50, and intonation 51. Other voice characteristics are possible. The voice characteristics can be measured by a spectrum analyzer or other type of device.

Phonetic characteristics have impressionistic and instrumental dimensions, which are related as percept and measurable physical dimensions. Pitch is a percept related to F0 for the fundamental frequency, the frequency of vibration of the larynx. Nasality influences the acoustic spectrum of speech sounds by changing and reshaping the spectrum due to opening of the nasal cavity during speech. Vowel quality is a percept associated with vocal tract resonant frequencies, which can be measured in the spectrum of the sound. Average resonance frequencies of particular vowels can be calculated by taking the average over a set of instances of their associated resonance frequencies at key moments or over key parts of a duration within pronunciation of a vowel, such as the first, second, and third (F1, F2, F3).

Spectral tilt is a measure of the overall relative energy levels in high versus low frequencies across the frequency range of speech. Specifically, spectral tilt is a measure of the overall slope of the signal's spectrum across a limited range of frequencies, whether higher in energy on average over the higher frequencies than the lower, or higher in energy in the lower frequencies as compared with the higher frequencies. Breathiness is a percept related to at least, the relative amount of energy outside the pure harmonics of F0 during speech, and is the opposite of creakiness, which can be measured as less energy outside the harmonics and as a higher spectral tilt. Pauses include blank periods with no speech and information about user traits can be derived from pause occurrence, location within the spoken word sequence, and duration. Intonation is the variation of pitch and amplitude, or loudness, and of timing of segments and words during speech and can indicate not just question versus statement intent, but also emotional stance and activation level, attitude toward a listener, self or topic, or an origin of the speaker, as well as other voice characteristics. Further, speech recognition can be performed on the voice sample to identify relevant or particular terms and phrases. The terms and phrases can be predetermined automatically or manually by an employee of the call center.

Each of the traits can be identified as a binary value, such that the trait is either present or absent, or alternatively, the trait can be identified along a continuum. When evaluated along a continuum, a particular trait can be determined using percentages or other continuous values. For instance, a personality of a caller may be determined to be 70% extrovert and 30% introvert.

Figure 4:
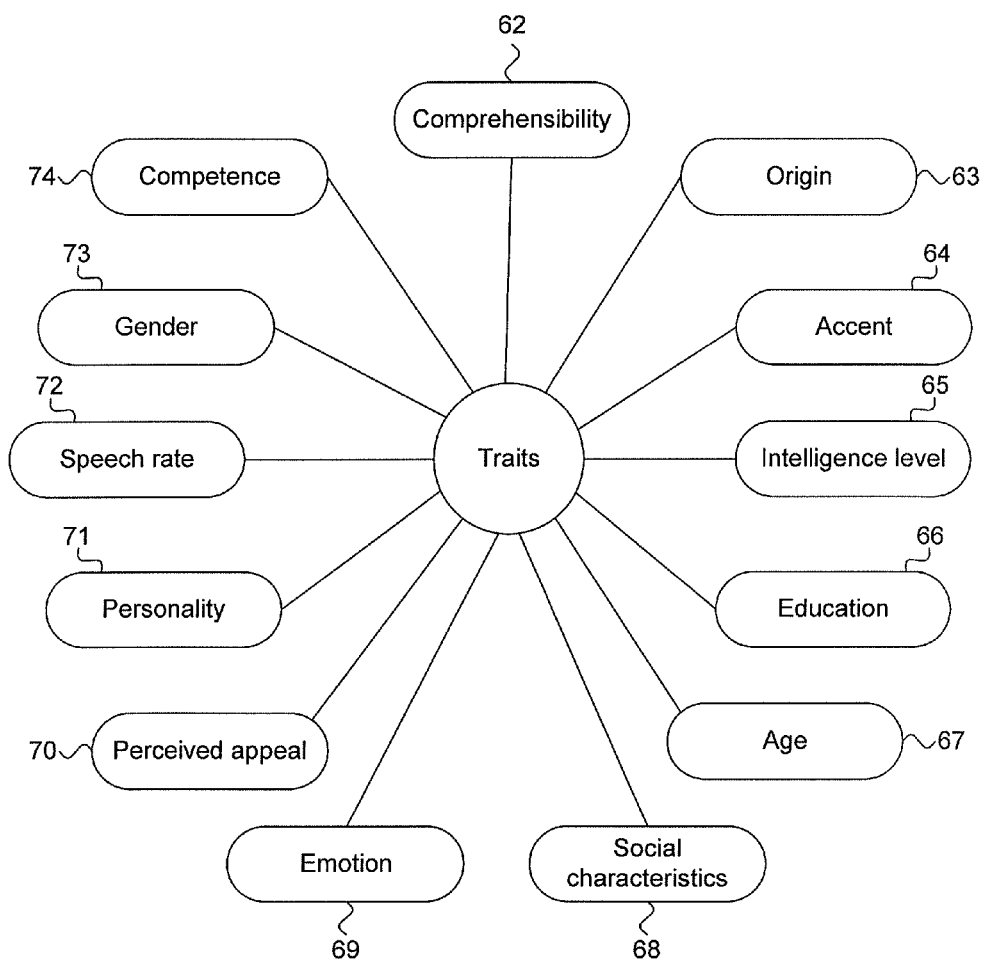
FIG. 4 is a flow diagram showing, by way of example, user traits.

After the analysis is performed, the voice characteristic measurements are used to characterize the speaker in terms of the modeled traits. FIG. 4 is a flow diagram showing, by way of example, various traits of a user. The traits can include comprehensibility 62, origin 63, accent 64, intelligence level 65, education 66, age, 67, social characteristics 68, emotion 69, perceived appeal 70, personality 71, speech rate 72, gender 73, and competence 74. Other characteristics and traits are possible.

Results of a voice analysis, such as voice characteristic measurements for or traits of an individual can help a call center make general assumptions about that individual. Comprehensibility identifies how well a user understands a script or other type of text, and can be based on voice characteristics, such as speed of speech and pronunciation of particular sounds, terms, or phrases. A user can be classified using models of speech characteristics associated with varying dialects, native languages, ages, genders, and social classes. The user can be assessed as fitting within a particular classification based on voice characteristics or information provided by the user. For example, a user's dialect can be determined by comparing a voice sample of the user with other populations to identify the population to which the user's voice sample is the most similar based on voice characteristics, such as intonation. The user's speech can then be classified as having the dialect associated with the most similar population. Additionally, dialect characteristics, such as voice intonation can be used to identify a social class for a user. For instance, upper class individuals, especially upper working class members, tend to have conservative pronunciation patterns while lower classes are more actively participating in the ongoing sound changes of a local dialect. Together, the classified social class and dialect can be compared to a chart of social class and dialect designations to identify an origin of the individual. Data provided by a user, such as a telephone number, address, or zip code, can also be used to classify the user as belonging to a particular geographic classification.

Accents can be estimated by typical vowel pronunciations, such as by determining where the user's vowels are located in acoustic space or in a normalized auditory space. An example of measuring vowel pronunciation identifies the pronounced term "pencil" versus "pincil." Whereas most non-Southern, non-African-American native English speakers may say the term "pencil," a Southeastern dialect speaker or an African American speaker from northern and western areas may pronounce "pincil." Similarly, mergers of sound pairs in various linguistic environments are ongoing in the U.S. and elsewhere, and can be used to identify speakers as belonging to a dialect region.

Gender and age can be estimated by measuring the frequencies of a voice sample. Women and small-bodied youth tend to have higher frequencies, while adult-sized men generally have lower frequencies associated with a larger size of their vocal apparatus, since larger objects resonate at lower frequencies. Other measurable characteristics can also be used to classify an individual as a male or female. For example, women tend to have breathier speech than men, which can be measured acoustically. Further, age can be estimated by measuring the frequencies of a voice sample or measuring an amplitude of control, such as tremors, terminology, sound changes, or pacing of the sample. A voice tremor is often characteristic of an older or ill individual. Similarly, the aged tend to have slower speech. Meanwhile, younger individuals tend to have lower frequencies, more amplitude control, and faster speech. Speech speed is also a differentiator of dialects, such as New York City versus rural Midwestern.

The emotions of an individual can be also be classified throughout a telephone call based on speech rate, pitch range, and loudness. For example, angry individuals usually have a fast speech rate and high pitch, while nervous individuals exhibiting "forced speech" can have a lack of reasonable pauses. Laughter is also a cue to emotional state and can be detected as sharp repeated amplitude modulation during speech unrelated to the amplitude constraints predicted by the linguistic sound sequence itself, or also by laughter between words. A personality of the user can be determined using the Myers-Briggs temperament dimensions, including extroversion versus introversion, sensing versus intuition, thinking versus feeling, and judging versus perceiving. These personality dimensions can be assessed automatically through measurements of the voice sample. For example, extroversion can be identified through per-turn word count, speech rate, and loudness, while judging can be identified use of terms related to schedules, decisions, and task completion. Feeling can be identified through use of terms related to feelings, while intuitiveness can be identified through use of abstract terms and sensing can be identified through use of terms that characterize concrete observations, times, places, or events. While not necessarily 100% classificatory, such observations tend in clear directions and can be used to influence and modify an agent's or the computer-controlled dialog system's response to callers so as to appeal to and connect more strongly with the caller's personal way of thinking and approaching decisions and relationships, such as a decision to buy or a relationship to a company or company representative.

Speech rate can be measured based on syllables per speech segment, speech segments per second, duration of pauses, and a number of syllables per pause. The segments can each include a sound, term, or phrase. The perceived appeal of a user to a type of audience can be measured based on dialect, prestige, or stereotypes held by the general public or defined groups. For example, women agents tend to be more successful than men when dealing with retention issues, based perhaps on a stereotype that women listen better than men. Additionally, men may be better at sales since they are seen as being more aggressive than women.

One or more intelligence levels of a user can be classified, including at least emotional intelligence and cognitive intelligence. Emotional intelligence measures whether the user understands and empathizes with the positions of other individuals, how well the user listens, and measures the diplomatic skills of the user. A determination as to whether the user understands third party positions can be performance based, such as a length of a call, sense of warmth in the user's voice, and terms used. Also, measures of uptake on the part of a listener can be used to determine whether the user understands a third party since a listener who is receiving empathy will commonly respond in a connected way with the user's message. Cognitive intelligence can be measured based on how well the user meets a third party request and processes the request. Other traits and measurements of the traits are possible. For example, standard statistical data analysis methods applied to detection and characterization of traits can lead to additional traits and measurements.

Figure 5:
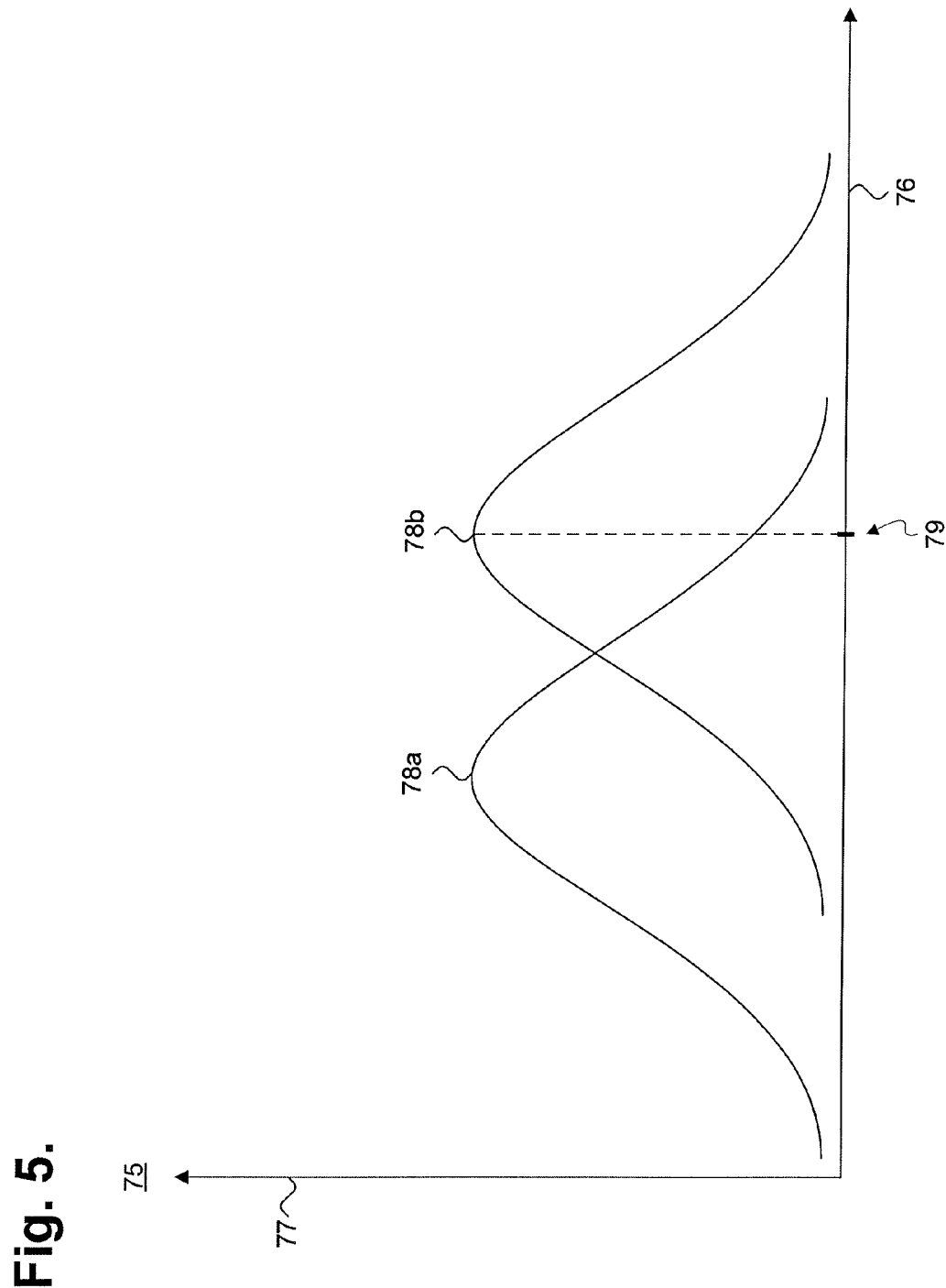
FIG. 5 displays a graph showing, by way of example, populations for a user trait.

The traits can be identified by comparing the voice sample of a user with measurements of voice characteristics associated with each trait. Alternatively, the user's voice sample can be compared with voice samples for particular populations classified as having a particular trait. Each trait can be measured separately. In one example, the user's voice sample is being analyzed to estimate a gender of the user so the user's voice sample is compared with populations for both the male and female gender. FIG. 5 displays a graph showing, by way of example, populations for a user trait. The x-axis represents a measure of average voiced-speech F0 across a sample of speech for each user in a population. The y-axis represents a likelihood or a probability that a user is associated with a given population associated with the gender trait. Two populations are each represented by a curve, which describes a distribution of individuals sharing that trait. The first curve 78a represents men, while the second curve represents women 78b. Generally, women tend to have a higher frequency than men, which is represented by values of the two curves along the x-axis.

A user's voice frequency is measured during a voice assessment and can be used to determine whether the user fits more closely within the female or male population. The user's voice frequency measurement is identified on the x-axis 79 and can be assumed to fit within the female population, which has the highest likelihood for that particular measurement of voice frequency.

Once identified, the traits can be utilized within the call center, such as for the hiring of agents, confirming identities of agents and callers, matching agents with callers, and guiding computer-controlled dialog systems, as well as coaching agents during and after calls. In the hiring of agents, the voice assessment is used to determine which agents are qualified for working at the call center. Agent hiring is further discussed below with reference to FIG. 6. A user's identity can be confirmed by matching voice recordings with a voice print for the user. In a further embodiment, the voice recordings can be compared with voice prints for the user and other third parties. User identification is further discussed below with reference to FIG. 8. Agents can be matched with callers based on a similarity of characteristics and traits shared between the agent and caller. Agent matching is further discussed below with reference to FIG. 9. Further, coaching can be provided to an agent based on user traits. For example, a voice assessment can be performed on a caller to determine what stage of persuasion the agent has reached and the agent can be coached to further persuade the agent to purchase a product or service offered. Agent coaching is further discussed below with reference to FIG. 10.

In a further embodiment, user traits can be used to manage call flow, balance agent console load, or process out of order callers as described in commonly-owned U.S. patent application Ser. No. 11/893,552, entitled "System and Method for Managing a Dynamic Call Flow During Automated Call Processing," filed Aug. 15, 2007, pending; U.S. patent application Ser. No. 11/893,542, entitled "System and Method for Balancing Agent Console Load During Automated Call Processing," filed Aug. 15, 2007, pending; and U.S. patent application Ser. No. 11/893,442, entitled "System and Method for Processing Out-Of-Order Caller Responses During Automated Call Processing," filed Aug. 15, 2007, pending, the disclosures of which are incorporated by reference.

Agent Hiring

Figure 6:
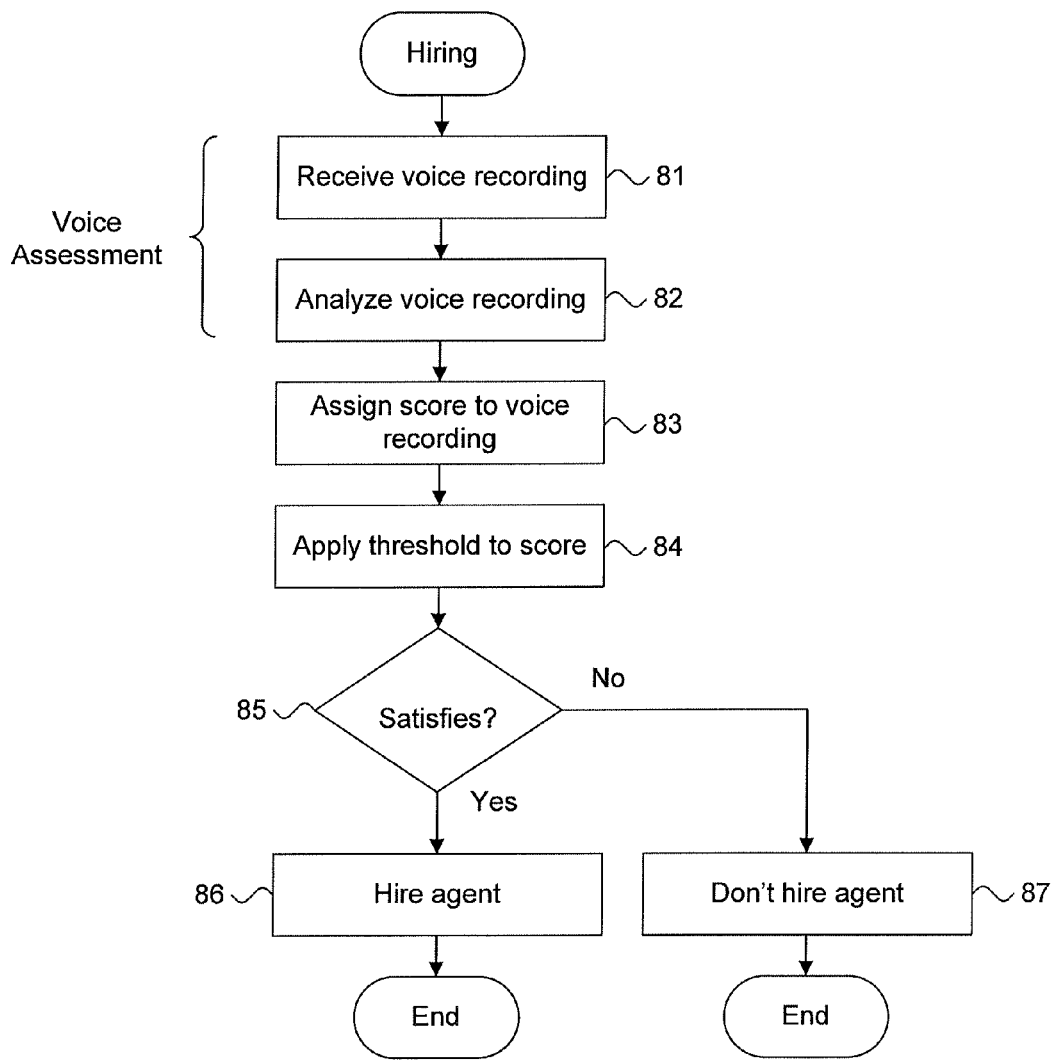
FIG. 6 is a flow diagram showing, by way of example, a method for hiring an agent.

Often times, call centers want to hire agents who are proficient in the language of the caller, who have a pleasant sounding voice, can follow a script, when provided, and are persuasive. Voice assessment can be used to analyze a voice sample and assign a score to the voice sample, which can be used for hiring purposes. FIG. 6 is a flow diagram showing, by way of example, a method for hiring an agent in a call center. A voice recording is received (block 81) from a candidate user, such as a potential agent to be hired by the call center. To generate the voice recording, the candidate user is prompted to repeat one or more text passages or pass phrases into a telephone. Each text passage can be provided more than once to correct for errors of the previous recording by the user, such as sneezing during recitation of the text passage. Further, each text passage can take the form of a model utterance, such as a voice-promoted, repeat-back, repetitive text passage.

Once received, the voice recording is analyzed (block 82) to determine whether the candidate user would be a suitable or successful agent based on the results of the voice analysis. During the analysis, voice characteristics are measured within the voice recording and a score is assigned (block 83) to the voice recording. The score can be assigned based on a sum of individual scores assigned to each voice characteristic considered or can be determined based on a presence or absence of particular voice characteristics, as well as other methods for determining a score.

Subsequently, a threshold is applied to the score (block 84). The score can be based on measurements for voice characteristics related to hiring factors, such as how well the user pronounces responses to readback or repeatback prompts, how close the user verbally sticks to a script, as well as other factors derived from a sound of the user's voice, such as the pitch, speed, and intonation. Further, the score can be automatically assigned or manually assigned, such as by an employee of the call center or a third party vendor. If the score satisfies (block 85) the threshold, the candidate user may be considered for hiring as an agent (block 86). However, if the score of the voice recording fails to satisfy (block 85) the threshold, the candidate user may not be hired as an agent (block 87). Subsequently, the agents on the list can be provided to the caller as recommendations for hire. In a further embodiment, a further list can be generated based on the agents associated with scores that failed to satisfy the threshold. The further list can also be provided to the call center for storing and later use.

In a further embodiment, the voice recording can be compared with a voice model generated from multiple individuals to see whether the user's speech fits within the community in a particular area. If the candidate user's speech is comparable to the voice model, that candidate's chances for hiring can be increased. Similarity and comparability of the voice recording and voice model can be measured using a threshold, an absolute value, as well as other metrics, and can be based on the voice characteristics individually or as a group.

In yet a further embodiment, the score and hiring can be determined automatically or reviewed, confirmed or overridden manually by an employee of the call center or a third party associated with the call center. Call center employees can set the threshold or adjust the threshold based on a need for agents as employees, such as by lowering a passing score when the need for agents is high and raising the passing score when the need for agents is low. Call center employees or third parties can access and manage the user voice assessments via a user interface and database. A display, such as a Web page, presents user voice assessments with at least one of snippets of the voice recording, score, grade, or classification for confirmation of the score.

Identity Confirmation

Often times, agents work remotely and an employer, such as the call center, is unable to verify whether the agent is actually on the other end of the phone. For example, family members or friends can answer the phone or make calls when the agent is unavailable. Confirmation questions can be ineffective to confirm an identity of the agent since the agent can coach others to answer the questions. To prevent unauthorized users from representing the call center, a voice assessment can be performed prior to logging into the call center.

Figure 7:
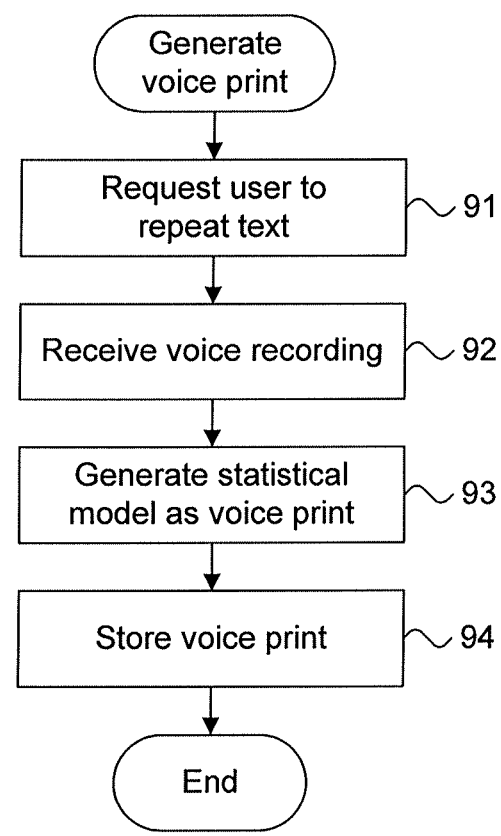
FIG. 7 is a flow diagram showing, by way of example, a method for generating a voice print.

An agent's identity can be confirmed by comparing a voice print for an agent against a voice recording. FIG. 7 is a flow diagram 90 showing, by way of example, a method for generating a voice print. A voice print is a set of measurable characteristics of an individual's voice that can differentiate individuals. The characteristics can be related to the size, shape, and configuration of the individual's mouth and throat during speech. For example, a voice sample can be obtained at key moments during pronunciation of one or more specific speech sounds or can be derived from measurements taken from audio recordings of the individual's speech to generate the voice print. Additionally, the voice print can be expressed as a mathematical formula and displayed graphically. A user, such as an agent, is requested to repeat one or more pass phrases (block 91) one or more times, which is received as a voice recording (block 92). The voice recording is subjected to signal processing algorithms and to measurements, which are used to generate a statistical model (block 93) of one or more voice characteristics from the voice recording as a voice print. The voice characteristics are described above in detail with respect to FIG. 3. In one example, each selected voice characteristic for a user can be represented graphically along with corresponding characteristics for other users, showing the power of the characteristics to uniquely identify users. The characteristics of one user together form the voice print for that particular user. Subsequently, the voice print is stored (block 94).

Figure 8:
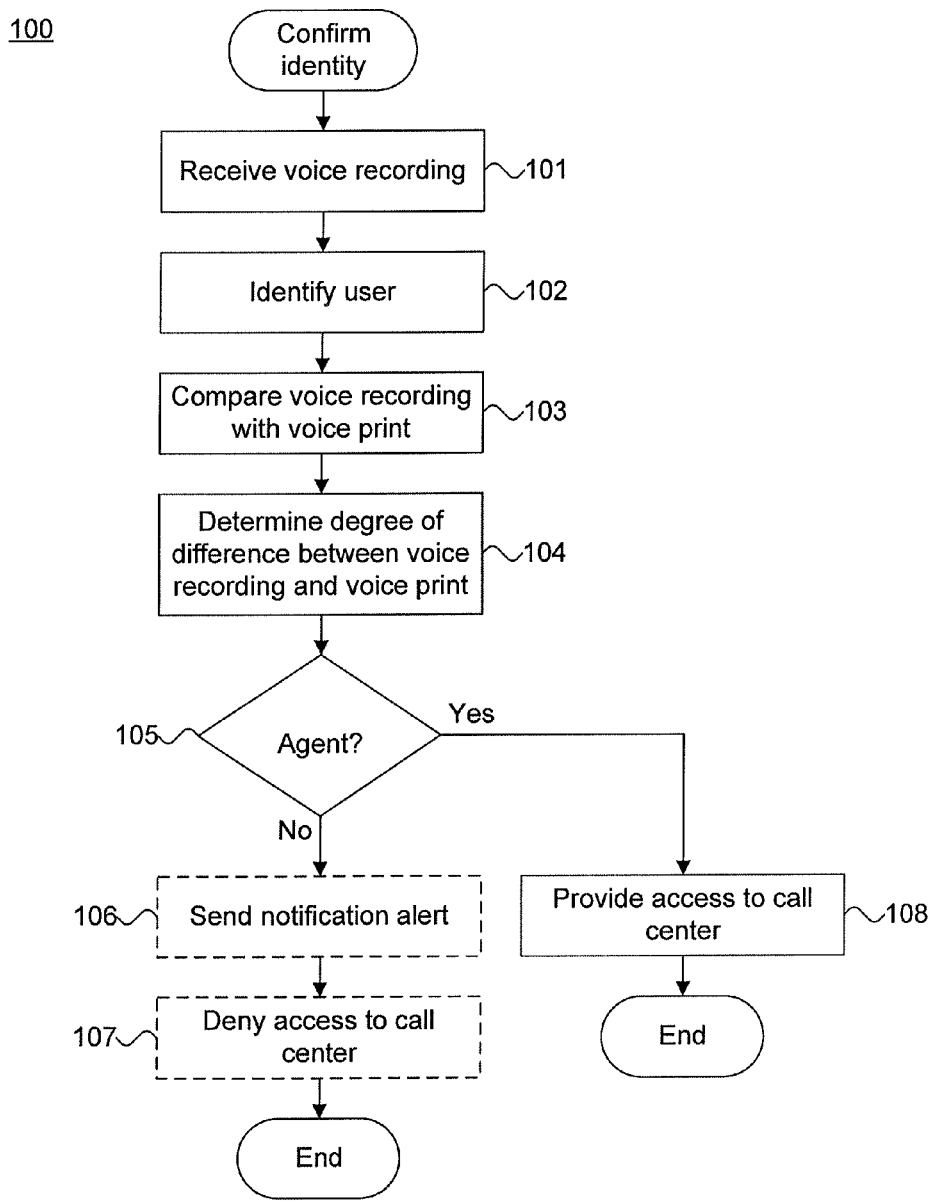
FIG. 8 is a flow diagram showing, by way of example, a method for confirming an agent identity.

The voice print can be generated at the time of hiring the agent and can be revised throughout employment of the agent, when necessary or advisable. Once generated, the voice print is compared with a further voice recording to confirm or reject a user's identity. FIG. 8 is a flow diagram showing, by way of example, a method for confirming an identity of an agent. A user, such as an unconfirmed agent is prompted to speak his pass code to access the call center. The user can be prompted daily, such as at the start of each shift, randomly, or at other predetermined times. The speech is received as a voice recording (block 101) and the user is identified (block 102) based on the pass code provided. To confirm the user's identity, a voice print is obtained for the identified user based on at least one of the pass code or the identity of the user. Once obtained, the voice print is compared with the voice recording (block 103). A distance, similarity, classification likelihood, closeness of fit, or other metric can be determined (block 104) based on the comparison of the voice print and the voice recording. The metric can then be used to determine a score for matching the voice recording and the voice print, taking into account variation between individuals in a population. The score is used to determine whether the user is the agent (block 105) associated with the voice print. When the score represents a high enough likelihood that the voice recording does not match the voice print, the user is unlikely to be confirmed as the agent associated with the voice print and a notification alert can be sent (block 106) to employees or supervisors within the call center environment. Alternatively, or in addition, the user can be denied access to the call center environment (block 107). However, when the score represents a high likelihood that the voice recording matches the voice print, the user can be confirmed as the agent associated with the voice print and may be allowed to access the call center (block 108). The score can be measured in standard deviations, by weight, as absolute values, or any other measurement derived from the voice characteristic. Further, the score can be compared with a threshold or against other user's scores to determine a measure of likelihood required to match the voice recording with the voice print and confirm the user's identity.

In a further embodiment, the pass phrase can be originally recorded by the user, as well as by other third party individuals. Subsequently, the user attempts to log in to his telephone and speaks the pass code, which is received as a recording. The recording is subjected to processing and measurements, and characteristics are derived, which can be compared with those of the original recordings of the pass phrase by the user and other individuals represented in individual and composite statistical models, including voice prints. A score is provided for each comparison and the user's identity is confirmed when the voice recording is closest to the voice print generated for that user.

In yet a further embodiment, the call center can adjust a threshold score used to decide a user's identity is not confirmed the voice recording provided by the purported user and the actual user's voice print.

Matching Agents with Callers

Agents generally experience the highest success when working with callers that relate to the agents. Often times, callers relate to agents based on a measure of similarity between a caller and an agent. The similarities can be based on traits, such as commonalities in gender, age, accent, origin, emotion, social characteristics, speech rate, and personality. Additionally, suitability of an agent can contribute to an agent's success, such as comprehensibility, perceived appeal to one or more audience types, competence at various types of tasks or skills, or agent's knowledge or access to important or relevant information.

Figure 9:
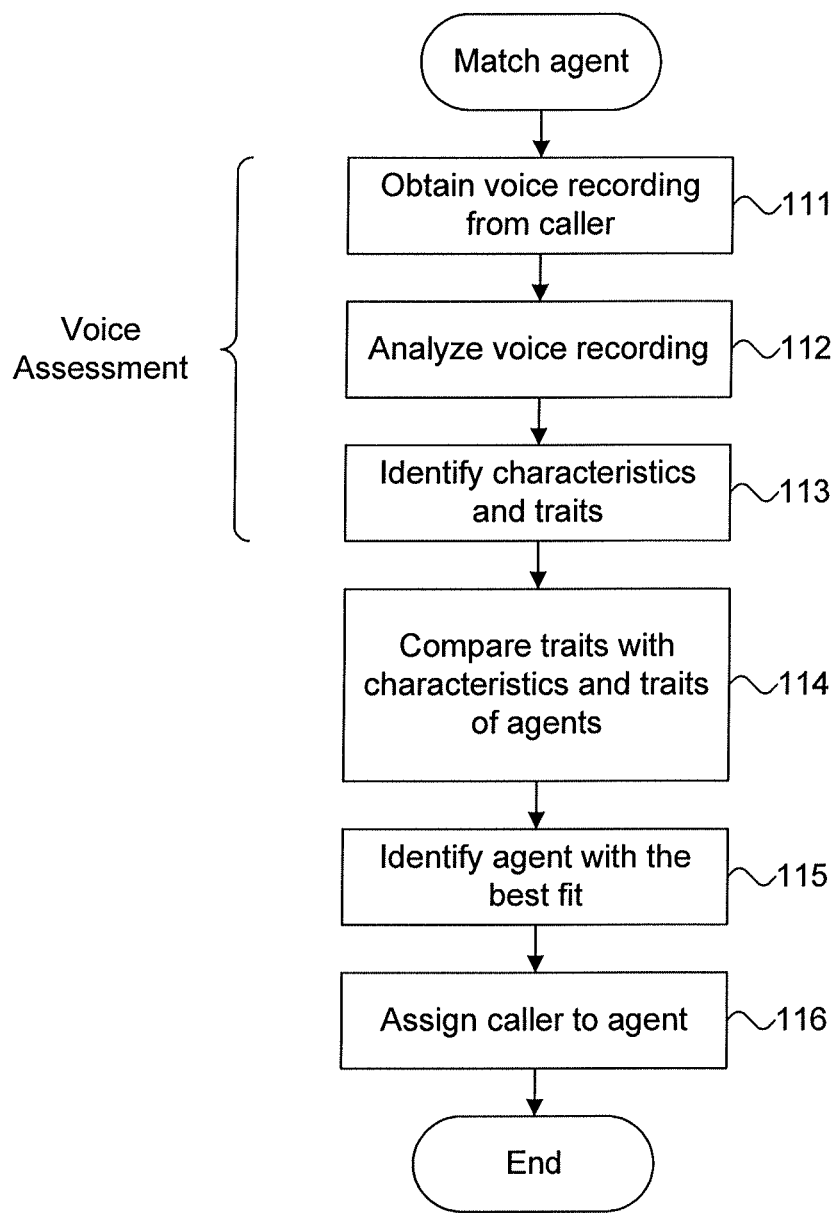
FIG. 9 is a flow diagram showing, by way of example, a method for matching an agent with a caller.

A voice assessment can be used to identify characteristics and traits of both callers and agents. Subsequently, the callers can be matched with agents having one or more similar characteristics or referred traits. FIG. 9 is a flow diagram showing, by way of example, a method for matching an agent with a caller. A voice recording is obtained from a caller (block 111) and analyzed (block 112) to identify traits of the caller (block 113). The analysis can be based on the voice characteristics described above with reference to FIG. 3, while the characteristics are described above with reference to FIG. 4. The caller traits can be compared with traits of one or more agents (block 114) to identify the agent most appropriate or similar to the caller (block 115). The most appropriate agent can be selected based on at least one of a number of shared traits with the caller, based on availability of the caller, and based on a demand for agents within the call center, as well as other factors, including skill level of the agent. The number of shared traits can be determined based on an absolute number, a threshold, or the highest number of shared traits. Once matched, the caller is transferred to the agent.

For example, a caller with a particular accent can be matched with an agent having the same or similar accent. In one embodiment, the trait can be either present or not present and in a further embodiment, the trait can be measured along a continuum and represented via a percentage or other continuous value. For instance, returning to the previous example, the accent can be determined to be British either because the accent is fully British or because the accent is mostly British, such as 90%. In a further embodiment, the accent can be determined to be 90% British and 10% Scottish. During a comparison of the accent trait, the caller can be matched based on a value of the particular trait with the highest percentage or based on both values.

In a further embodiment, two or more traits can be used to match the agent to a caller. The traits can be weighted to provide preference to particular traits. For instance, a weight of 0.8 can be assigned to the trait of gender, while a weight of 0.4 can be assigned to accents. Thus, even though an agent may have a higher similarity to a first caller based on accent, the agent may be assigned to a different caller based on a higher weight assigned to the gender trait.

In a further embodiment, multiple analyses can be performed on multiple voice samples for a user to assist in matching agents to callers. For example, some users may have another available accent that they can use at desired times. The available accent can come from an individual that represses their native dialect in a different place or from learning another accent after travel or social contact with individuals having a different accent. In such a case, the individual can be classified with multiple populations based on accent. Each different population can associated with a single accent or more than one accent, such as based on a continuum. Therefore, a caller and an agent can be matched by the accent skills of the agent. Furthermore, the agent can be explicitly informed that the caller has been identified as a speaker of a particular dialect and to make an appropriate decision as to how to present himself based on that knowledge. Thus, an agent can be assigned to a caller with the most similar or most suitable accent for the kind of interaction expected. In another example, the agent may be able to replicate certain accents, which can be used to pair the agent with a caller having the same or similar accents. In yet a further example, automatic voice response systems can be programmed with different accents and the caller can be routed to hear audio prompts that are matched to the accent of the caller.

Coaching Agents

Figure 10:
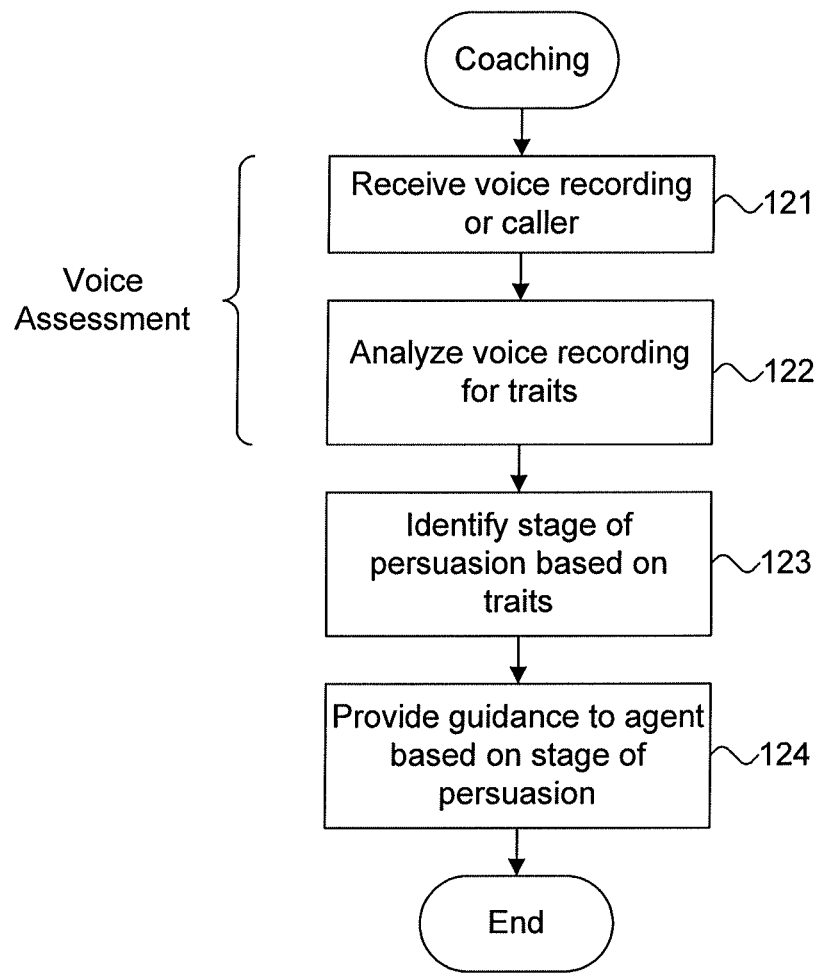
FIG. 10 is a flow diagram showing, by way of example, a method for coaching an agent.

Voice assessment can be performed on callers and agents to assist agents in successful transactions with the callers. FIG. 10 is a flow diagram 120 showing, by way of example, a method for coaching an agent. A voice recording is received from a caller (block 121) and analyzed to identify traits of the caller (block 122). The identified characteristics and traits are used to determine a stage of persuasion for the caller (block 123). The stage of persuasion can measure how likely a caller is to accept an offer provided by the agent. For example, the agent may provide an offer to sign up for a free trial period that includes a month of cable at no cost or the offer can include an upsell of an existing order. Once identified, guidance (block 124) can be provided to the agent based on the stage of persuasion to successfully close the deal, which can include the caller accepting the offer presented by the agent. The guidance can be provided automatically through scripts or manually by a user associated with the call center, as further described below.

The stages of persuasion can identify how influenced a caller may be and specifically how likely a caller is to purchase a product or service. The stages of persuasion can include five stages, such as already fully persuaded, tending towards agreement, neutral, tending away from agreement, and fully decided to not listen. The assignment of a persuasion stage to a caller can occur automatically by a computer making observations of the audio recordings of the call, such as during or after the call, or manually by an employee in the call center or other third party. If a caller is identified as being in the already persuaded or not listening stage, no further persuasion efforts are likely to be useful with regards to the current offer presented and the agent can respectively close the deal, or say goodbye as appropriate to the persuasion state of the caller. In a further embodiment, the agent can move away from the current offer and present a different offer.

However, if the user is identified as being in the neutral, tending towards agreement, or tending away from agreement stages, further persuasion by the agent may be effective in getting the caller to move towards agreement, such as to purchase available goods or services. Various paralinguistic voice characteristics can be used to classify the user as belonging in a particular stage of persuasion, including correlates of emotional stress or relaxation found in patterns of pausing, pitch contours, or silence as a potential indicator of disagreement (or in situations of high detectable measures of rapport, as an indicator of agreement), as well as other paralinguistic characteristics. Additionally, speech recognition can be used to identify linguistic indicators, such as particular terms, phrases, and ways of overtly expressing stance or attitude that would help classification of the caller into one of the stages of persuasion.

If the caller is classified as being neutral, tending toward agreement, or tending away from agreement, the automatic computer system can provide guidance to the agent through scripts, popup screens, or other methods to assist the agent in moving the caller in a desired direction, such as away from irate hostility toward calm acceptance or away from mere open-mindedness and toward closing a sale. In a further embodiment, another agent or supervisor can manually provide guidance to the agent. The guidance provided depends on a degree of automation of the call. For instance, when the call is not automated, a pop up on the agent's screen can appear with suggested responses to the caller. Alternatively, when the system is completely automated, different dialogue options can be presented via automatic call flow programmed to take into account the caller's stage of persuasion or emotional state. Other types of guidance are possible.

In a further embodiment, prior call outcomes can be studied and summarized. For example, two call outcomes can be identified, such as those calls in which a sale was made and those calls in which no sale was made. An analysis is performed on each group of calls to identify a set of factors for each of the two groups. Subsequently, a voice analysis is performed on a current caller to identify which group the call is more likely to fit in. Guidance can be provided to the agent, or call-flow choices made by an automatic dialog system based on the identified group for the caller.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing guidance to persuade a caller, comprising:
 a receipt module to receive a call from a caller into a call center;
 an offer module to provide an offer to the caller;
 a measurement module to measure a likelihood of the caller to accept the offer by analyzing voice input of the caller during the call, comprising:
  a model generation submodule that generates a model comprising multiple overlapping population distributions to determine voice characteristic values;
  a detection submodule to detect at least one of a paralinguistic voice characteristic of the voice input;
  an identification submodule to identify a single value for the detected paralinguistic voice characteristic within the model;
  an association submodule to associate the caller's paralinguistic voice characteristic with a trait by selecting one of the subtraits as the trait representative of the paralinguistic voice characteristic based on a relationship between the paralinguistic voice characteristic value and each of the population distribution curves; and
  an assignment submodule to assign the caller to at least one of a plurality of likely sale groups based on the caller's identified traits; and
 a recommendation module to provide a recommendation for guidance to persuade the caller to accept the offer based on the assigned group.

2. A system according to claim 1, further comprising:
 a guidance module to provide the guidance via at least one of automatically through scripts and manually by a user associated with the call center.

3. A system according to claim 1, further comprising:
 an outcome module to study prior call outcomes and to identify characteristics from the prior call outcomes consistent with one or more of the stages of persuasion.

4. A system according to claim 3, wherein the assignment module assigns the stage of persuasion to the caller based on the paralinguistic voice characteristics and the characteristics from the prior call outcomes.

5. A system according to claim 1, wherein the guidance to the agent is provided via popup screens on a monitor of the agent.

6. A system according to claim 1, further comprising:
 a speech recognition engine to perform speech recognition on the voice input; and
 a metric identification module to identify linguistic metrics of the voice input based on the speech recognition.

7. A system according to claim 6, wherein the stage of persuasion is assigned based on the linguistic metrics and the paralinguistic voice characteristics.

8. A system according to claim 1, further comprising:
 a guidance module to provide the guidance as different dialogue options via an automatic call flow.

9. A system according to claim 1, wherein the stage of persuasion is assigned via at least one of automatically by a computer and manually by a user associated with the call center.

10. A system according to claim 1, wherein the stage of persuasion measures how likely the caller is to accept the offer.

11. A method for providing guidance to persuade a caller, comprising the steps of:
 receiving a call from a caller into a call center; using a call center internetwork;
 providing an offer to the caller using a call center internetwork;
 measuring a likelihood of the caller to accept the offer by analyzing voice input of the caller during the call using the call center voice assessor, comprising:
  generating a model comprising multiple overlapping population distributions to determine voice characteristic values using a call center internetwork;
  detecting at least one of a paralinguistic voice characteristic of the voice input using the call center voice assessor and a call center database; and
  identifying a single value for the detected paralinguistic voice characteristic within the model using the call center voice assessor and a call center database;
  associating the caller's paralinguistic voice characteristic with a trait by selecting one of the subtraits as the trait representative of the paralinguistic voice characteristic based on a relationship between the paralinguistic voice characteristic value and each of the population distribution curves using the call center voice assessor and a call center database; and
  assigning the caller to at least one of a plurality of likely sale groups based on the caller's identified traits using the call center voice assessor and the call center database; and
 making a recommendation for guidance to persuade the caller to accept the offer, wherein the steps are performed by a specialized computer.

12. A method according to claim 11, further comprising:
 providing the guidance via at least one of automatically through scripts and manually by a user associated with the call center.

13. A method according to claim 11, further comprising:
 studying prior call outcomes; and
 identifying characteristics from the prior call outcomes consistent with one or more of the stages of persuasion.

14. A method according to claim 13, further comprising at least one of:
 utilizing the characteristics from the prior call outcomes to assign the stage of persuasion to the caller.

15. A method according to claim 11, wherein the guidance to the agent is provided via popup screens on a monitor of the agent.

16. A method according to claim 11, further comprising:
 performing speech recognition on the voice input; and
 identifying linguistic metrics of the voice input based on the speech recognition.

17. A method according to claim 16, wherein the stage of persuasion is assigned based on the linguistic metrics and the paralinguistic voice characteristics.

18. A method according to claim 11, further comprising:
 providing the guidance as different dialogue options via an automatic call flow.

19. A method according to claim 11, wherein the stage of persuasion is assigned via at least one of automatically by a computer and manually by a user associated with the call center.

20. A method according to claim 11, wherein the stage of persuasion measures how likely the caller is to accept the offer.

* * * * *